(12) United States Patent
Hagino

(10) Patent No.: US 10,557,543 B2
(45) Date of Patent: Feb. 11, 2020

(54) HYBRID VEHICLE AND LUBRICATION STRUCTURE OF HYBRID VEHICLE

(71) Applicant: TOYOTA JIDOSHA KABUSHIKI KAISHA, Toyota-shi, Aichi-ken (JP)

(72) Inventor: Yoshiteru Hagino, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 15/841,822

(22) Filed: Dec. 14, 2017

(65) Prior Publication Data

US 2018/0180164 A1 Jun. 28, 2018

(30) Foreign Application Priority Data

Dec. 27, 2016 (JP) ................. 2016-252619

(51) Int. Cl.
| | |
|---|---|
| *F16H 57/04* | (2010.01) |
| *B60K 6/445* | (2007.10) |
| *F16H 57/08* | (2006.01) |
| *B60K 6/405* | (2007.10) |
| *B60W 20/15* | (2016.01) |
| *B60K 6/48* | (2007.10) |
| *B60W 10/06* | (2006.01) |
| *B60W 10/08* | (2006.01) |

(52) U.S. Cl.
CPC ......... *F16H 57/0439* (2013.01); *B60K 6/405* (2013.01); *B60K 6/445* (2013.01); *F16H 57/043* (2013.01); *F16H 57/0435* (2013.01); *F16H 57/0476* (2013.01); *F16H 57/082* (2013.01); *B60K 6/48* (2013.01); *B60W 10/06* (2013.01); *B60W 10/08* (2013.01); *B60W 20/15* (2016.01)

(58) Field of Classification Search
CPC .............. F16H 57/0439; F16H 57/082; F16H 57/0476; F16H 57/0435; F16H 57/043; B60K 6/405; B60K 6/445
See application file for complete search history.

(56) References Cited

U.S. PATENT DOCUMENTS

| | | | |
|---|---|---|---|
| 2009/0165587 A1* | 7/2009 | Ariga | F16H 57/0423 74/467 |
| 2011/0192245 A1* | 8/2011 | Shioiri | F16H 57/0423 74/467 |

(Continued)

FOREIGN PATENT DOCUMENTS

JP 2016-168950 A 9/2016

*Primary Examiner* — Patrick H Mackey
(74) *Attorney, Agent, or Firm* — Oliff PLC

(57) ABSTRACT

A lubrication structure of a hybrid vehicle includes a gear chamber that houses a planetary gear unit and a differential device, and a motor chamber that houses a rotating electric machine, and is separated from the gear chamber by a partition wall. Lubricating oil stored in a bottom portion of the gear chamber is stirred up through rotation of a final reduction gear of the differential device disposed in a lower portion of the gear chamber, so that the lubricating oil is supplied to the planetary gear unit. One end of a cylindrical output member of the planetary gear unit is rotatably supported by a partition wall via a bearing, and a communication hole that communicates the gear chamber with the motor chamber is provided in an opposed portion of the partition wall which is opposed to a vicinity of an outer peripheral edge of the bearing.

10 Claims, 4 Drawing Sheets

(56) References Cited

U.S. PATENT DOCUMENTS

| | | | |
|---|---|---|---|
| 2013/0145879 A1* | 6/2013 | Nakamura | F16H 57/042 74/467 |
| 2016/0186854 A1* | 6/2016 | Tahara | F16H 57/0424 74/468 |
| 2016/0186855 A1* | 6/2016 | Tahara | F16H 57/0471 74/413 |
| 2016/0265652 A1* | 9/2016 | Nishimine | B60K 6/48 |
| 2017/0102064 A1* | 4/2017 | Preston | F16H 57/0423 |
| 2017/0159794 A1* | 6/2017 | Nishizawa | F16H 57/021 |
| 2019/0173343 A1* | 6/2019 | Yamaguchi | H02K 1/28 |
| 2019/0173359 A1* | 6/2019 | Ishikawa | H02K 9/19 |
| 2019/0181720 A1* | 6/2019 | Yamaguchi | H02K 7/116 |

* cited by examiner

HYBRID VEHICLE AND LUBRICATION STRUCTURE OF HYBRID VEHICLE

INCORPORATION BY REFERENCE

The disclosure of Japanese Patent Application No. 2016-252619 filed on Dec. 27, 2016 including the specification, drawings and abstract is incorporated herein by reference in its entirety.

BACKGROUND

1. Technical Field

The disclosure relates to a hybrid vehicle and a lubrication structure of a hybrid vehicle, and in particular to a lubrication structure of a hybrid vehicle including a transaxle type power transmission mechanism.

2. Description of Related Art

In a vehicle including a transaxle type power transmission mechanism in which a transmission, such as a speed changer or a power split device, and a differential device are integrated, so-called stirring-up lubrication is generally used as a method of lubricating the power transmission mechanism. In this method, lubricating oil stored in a transaxle case is stirred up by a final reduction gear of the differential device, so as to be supplied to the power transmission mechanism. In the vehicle using this lubricating method, the differential device is located in a lower portion of the transaxle case, and a lower end portion of the final reduction gear is immersed in the lubricating oil stored in a bottom portion of the case. In this condition, if the final reduction gear of the differential device rotates, the lubricating oil stirred up with the rotation is supplied to meshing parts of respective gear elements of the transmission, for example, so that the gear elements, etc. are lubricated.

In the meantime, in a known example of a hybrid vehicle using both an engine and a rotating electric machine as power sources, a planetary gear mechanism is used as a power split device for distributing power from the engine to the rotating electric machine and drive axles of wheels, and one example of a lubrication system for gears, etc. of the planetary gear mechanism is disclosed in Japanese Patent Application Publication No. 2016-168950 (JP 2016-168950 A). In the lubrication system described in JP 2016-168950 A, the lubricating oil is supplied, through stirring-up lubrication, to a cylindrical output member of the planetary gear mechanism having an externally toothed gear formed on its outer circumferential surface so as to transmit power to a drive shaft. Then, a part of the lubricating oil subjected to stirring-up lubrication flows into the inner side of the output member, through bearings that support the output member, in the direction of the rotational axis, and is supplied to constituent members disposed on the inner side of the output member, for example, to a plurality of planetary gears, etc. that mesh with an internally toothed gear formed on an inner circumferential surface of the output member.

SUMMARY

In the lubrication system of the related art, when the vehicle travels at a high speed, the rotational speed of the output member of the power split device (planetary gear mechanism) increases, and the rotational speed of the bearings that support the output member also increase, so that passage of the lubricating oil through the bearings as described above is impeded by rotation of the bearing. As a result, the lubricating oil that fails to pass through the bearings is retained in a gap between each bearing that supports the output member, and an inner wall of the transaxle case in the vicinity of the bearing, and the resistance to stirring during rotation of the output member increases due to the retained lubricating oil, resulting in increase of a stirring loss.

Thus, the disclosure provides a hybrid vehicle and a lubrication structure of a hybrid vehicle, which is able to curb increase of a stirring loss which occurs when the vehicle speed is high.

A first aspect of the present disclosure provides a lubrication structure of a hybrid vehicle. The lubrication structure includes a first case and a second case. The first case has a gear chamber in which a planetary gear unit connected to an engine and a rotating electric machine, and a differential device to which power is transmitted from the planetary gear unit, are housed. The differential device is disposed in a lower portion of the gear chamber. The second case has a motor chamber in which the rotating electric machine is housed. The motor chamber is separated from the gear chamber by a partition wall. The lubrication structure is configured to supply lubricating oil to the planetary gear unit by stirring up the lubricating oil stored in a bottom portion of the gear chamber through rotation of a final reduction gear of the differential device. The planetary gear unit includes a cylindrical output member that has an externally toothed gear for transmitting power to the differential device, on an outer circumferential surface of the cylindrical output member, and an internally toothed gear on an inner circumferential surface of the cylindrical output member. One end of the output member is rotatably supported by the partition wall via a bearing. In this lubrication structure, a communication hole that communicates the gear chamber with the motor chamber is provided in an opposed portion of the partition wall which is opposed to a vicinity of an outer peripheral edge of the bearing.

With this configuration, the communication hole that communicates the gear chamber with the motor chamber is provided in the opposed portion of the partition wall. Therefore, when the lubricating oil that fails to pass through the bearing is retained in a gap between the bearing that supports the output member, and the partition wall in the vicinity of the bearing, as the vehicle travels at a high speed, and the rotational speed of the output member of the planetary gear unit (power split device) housed in the gear chamber becomes high, the retained lubricating oil is discharged toward the motor chamber, through the communication hole.

In the lubrication structure of the hybrid vehicle, the communication hole may be provided in a portion of the opposed portion which is lower than an axis of the bearing.

In the lubrication structure of the hybrid vehicle, the communication hole may have an opening on the gear chamber side. The partition wall may further include a protruding portion that protrudes from a lower edge portion of the opening on the gear chamber side, toward the output member. The protruding portion may be configured to cause the supplied lubricating oil to flow into the opening on the gear chamber side.

In the lubrication structure of the hybrid vehicle, the communication hole may have an opening on the motor chamber side that is located at a position lower than a lowermost end of a rotor of the rotating electric machine.

A second aspect of the disclosure provides a hybrid vehicle. The hybrid vehicle includes a parking gear, an engine, and a lubrication structure. The lubrication structure includes a first case and a second case. The first case has a gear chamber in which a planetary gear unit connected to an engine and a rotating electric machine, and a differential device to which power is transmitted from the planetary gear unit, are housed. The differential device is disposed in a lower portion of the gear chamber. The second case has a motor chamber in which the rotating electric machine is housed. The motor chamber is separated from the gear chamber by a partition wall. The lubrication structure is configured to supply lubricating oil to the planetary gear unit by stirring up the lubricating oil stored in a bottom portion of the gear chamber through rotation of a final reduction gear of the differential device. The planetary gear unit includes a cylindrical output member that has an externally toothed gear for transmitting power to the differential device, on an outer circumferential surface of the cylindrical output member, and an internally toothed gear on an inner circumferential surface of the cylindrical output member. One end of the output member is rotatably supported by the partition wall via a bearing. In this lubrication structure, a communication hole that communicates the gear chamber with the motor chamber is provided in an opposed portion of the partition wall which is opposed to a vicinity of an outer peripheral edge of the bearing. The parking gear is provided on an end portion of the output member which is located closer to the partition wall and opposite to the externally toothed gear.

Accordingly, with the lubrication structure of the hybrid vehicle according to the disclosure, increase of a stirring loss which occurs when the vehicle speed is high can be curbed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
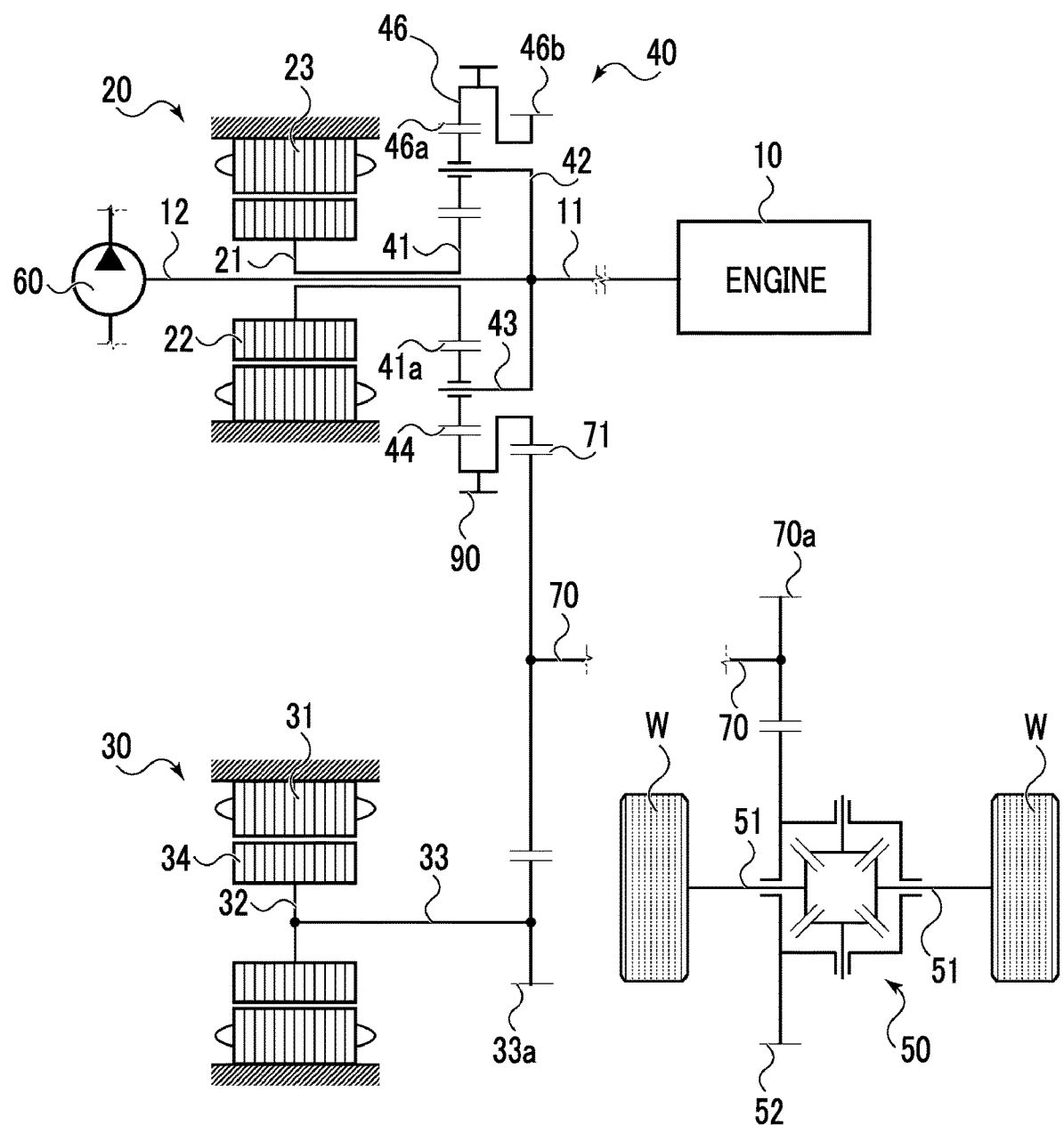
FIG. 1 is a schematic view showing the general configuration of a hybrid vehicle in which a lubrication structure according to one embodiment of the disclosure is used.
Figure 2:
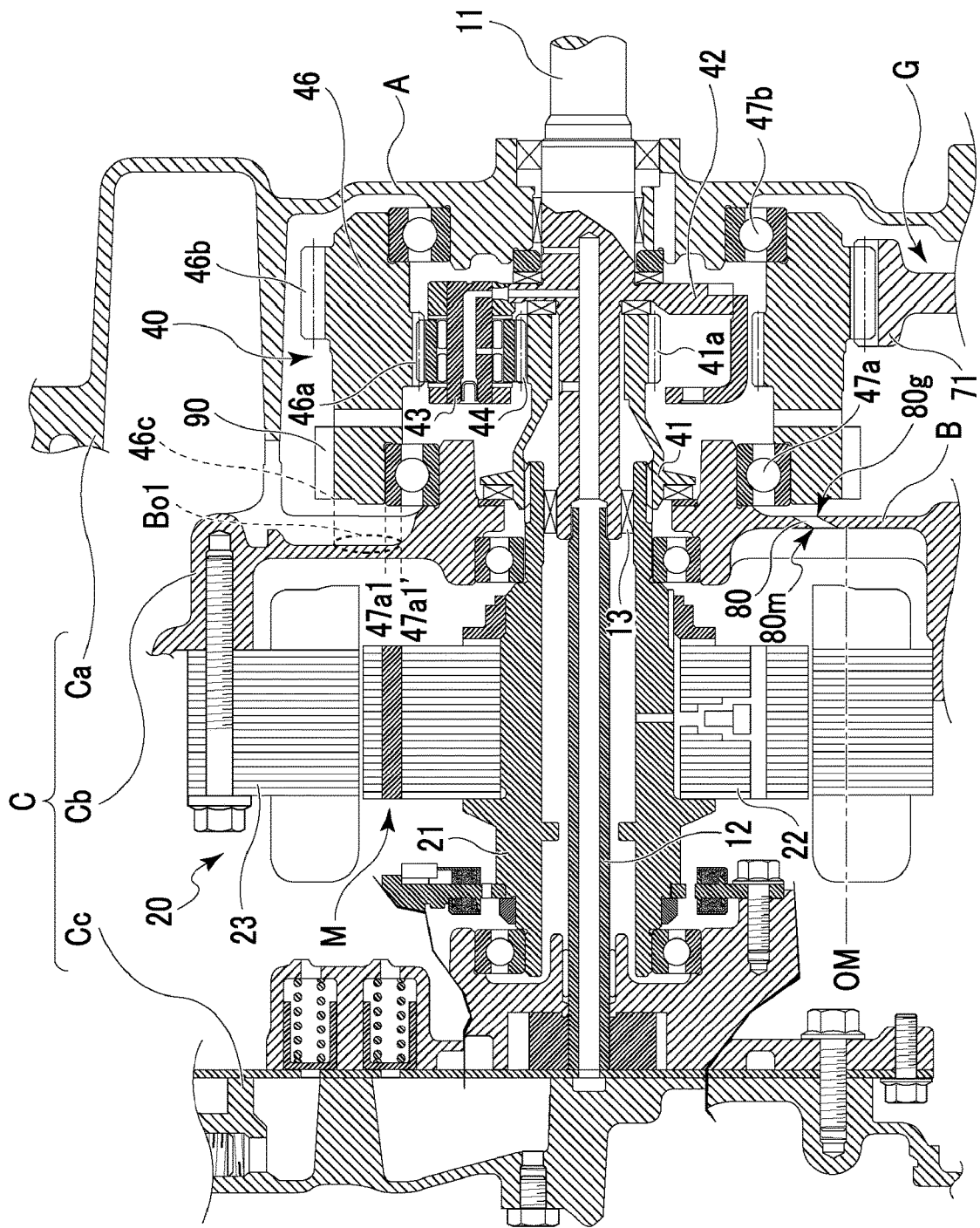
FIG. 2 is an enlarged cross-sectional view showing a planetary gear mechanism incorporated in a power transmission mechanism of the hybrid vehicle.

Referring to FIG. 1 and FIG. 2, a lubrication structure of a hybrid vehicle according to one embodiment of the disclosure will be described. The lubrication structure of this embodiment is employed in a hybrid vehicle including a transaxle type power transmission mechanism. The general configuration of the hybrid vehicle is schematically illustrated in FIG. 1.

In this embodiment, the hybrid vehicle includes one engine 10, and two rotating electric machines 20, 30, as power sources. The engine 10 is an internal combustion engine, such as a gasoline engine or a diesel engine. A first rotating electric machine 20 is preferably a motor-generator that can regenerate energy and generate motive power. Similarly, a second rotating electric machine 30 is preferably a motor-generator.

In this embodiment, the hybrid vehicle is switched between an EV mode in which the hybrid vehicle travels only with the rotating electric machines 20, 30 operated while the engine 10 is kept stopped, and an HV mode in which the vehicle travels with the rotating electric machines 20, 30 and the engine 10 operated.

A power transmission system T including a planetary gear train (planetary gear mechanism) 40 and a differential device 50 is incorporated between the engine 10 and the rotating electric machines 20, 30, and drive wheels W. Right and left axles 51 as a pair of axles of the differential device 50 protrude to the right and the left, from lateral ends of a housing Ca and a casing Cb of a transaxle case C, and right and left wheels W as a pair of wheels are coupled to the right and left axles 51, respectively.

The planetary gear train 40 (one example of the planetary gear unit of the disclosure) mounted between the engine 10 and the first rotating electric machine 20 is enlarged and illustrated in FIG. 2. One end portion (on the right-hand side in FIG. 2) of an input shaft 11 is coupled to the engine 10, via a torsional vibration damper (not shown). One end portion of a pump drive shaft 12 is spline-fitted to the other end portion of the input shaft 11, and a mechanical oil pump 60 is coupled to the other end portion (on the left-hand side in FIG. 2) of the pump drive shaft 12. The mechanical oil pump 60 serves to supply lubricating oil to the power transmission system T, etc., and operates in conjunction with the engine 10. Since the lubricating oil is supplied to the power transmission system T, etc., in a condition where the engine 10 is stopped, during traveling in the EV mode, for example, the hybrid vehicle of this embodiment further includes an electrically powered oil pump (not shown) in addition to the mechanical oil pump 60.

A rotor 22 of the first rotating electric machine 20 is mounted on a hollow rotor shaft 21 that surrounds the pump drive shaft 12. A stator 23 of the first rotating electric machine 20, which surrounds the rotor 22, is fixed to the casing Cb of the transaxle case C, along with a stator 31 of the second rotating electric machine 30. Opposite end portions of the rotor shaft 21 of the first rotating electric machine 20 are rotatably supported by the casing Cb and a rear cover Cc, respectively, and the above-mentioned other end portion of the pump drive shaft 12 is also rotatably supported by the rear cover Cc. One end portion of the input shaft 11 is rotatably supported by the housing Ca of the transaxle case C. The other end portion of the input shaft 11 enters the inside of one end portion (on the right-hand side in FIG. 2) of the rotor shaft 21 of the first rotating electric machine 20. A needle roller bearing 13 is mounted between the other end portion of the input shaft 11, and the rotor shaft 21 of the first rotating electric machine 20. With this arrangement, the input shaft 11 is supported by the rotor shaft 21 of the first rotating electric machine 20 such that the input shaft 11 is rotatable relative to the rotor shaft 21.

A hollow sun gear 41 is disposed on the same axis as the input shaft 11 such that the sun gear 41 surrounds the input shaft 11, and a sun gear portion 41a is formed on one end portion (on the right-hand side in FIG. 2) of the sun gear 41. The other end portion of the sun gear 41 is spline-fitted on one end portion of the rotor shaft 21 of the first rotating electric machine 20. A carrier 42 in the form of a disc is fixed to the input shaft 11, and two or more planetary gear shafts 43 are fixed to the carrier 42, such that the planetary gear shafts 43 protrude from the carrier 42 in parallel with the rotational axis of the input shaft 11, so as to surround the sun gear portion 41a. A planetary gear 44 that meshes with the sun gear portion 41a is rotatably supported by each of the planetary gear shafts 43, via a needle roller bearing (not shown). A gear sleeve 46 is disposed on the same axis as the sun gear 41 so as to surround the planetary gears 44, and an internal gear portion 46a (one example of the internally toothed gear of the disclosure) that meshes with the planetary gears 44 is formed on an inner circumferential surface of the gear sleeve 46. The gear sleeve 46 as an output member of the planetary gear train 40 is rotatably supported at its longitudinally opposite end portions by the casing Cb and housing Ca of the transaxle case C, via a pair of ball bearings 47a, 47b, respectively. The gear sleeve 46 is formed at its outer circumferential surface with an external gear portion 46b (one example of the externally toothed gear of the disclosure) that meshes with a large gear 71 of an auxiliary shaft 70.

The differential device 50 is placed in a lower portion of the transaxle case C (gear chamber), and the auxiliary shaft 70 is placed above the differential device 50. Opposite end portions of the auxiliary shaft 70 are rotatably supported by the housing Ca and casing Cb of the transaxle case C. The large gear 71 is fixed to one end portion (on the left-hand side in FIG. 1) of the auxiliary shaft 70, and the large gear 71 meshes with the external gear portion 46b of the gear sleeve 46 of the planetary gear train 40, and a small gear 33a of a motor output shaft 33 of the second rotating electric machine 30. The motor output shaft 33 is spline-fitted to a rotor shaft 32 connected to a rotor 34 of the second rotating electric machine 30. Also, an output gear 70a that meshes with a final reduction gear 52 of the differential device 50 is formed at one side of the large gear 71 closer to the other end of the auxiliary shaft 70.

With the hybrid vehicle of this embodiment thus configured, when power is transmitted from the engine 10, etc. to the gear sleeve 46 of the planetary gear train 40, the power is delivered from the external gear portion 46b that rotates as a unit with the gear sleeve 46, and is transmitted to the large gear 71 that meshes with the external gear portion 46b. The power transmitted to the large gear 71 is applied, via the auxiliary shaft 70, to the final reduction gear 52 of the differential device 50 which meshes with the output gear 70a. Then, the power applied to the final reduction gear 52 is transmitted to the right and left wheels (drive wheels) W via the right and left axles (drive axles) 51 of the differential device 50, and delivered as rotary drive force.

As shown in FIG. 2, the transaxle case C consists of three case members, i.e., the housing Ca, casing Cb, and the rear cover Cc. These three case members are connected to each other, so that space that houses gear mechanisms of the power transmission system in the vehicle and space that houses the rotating electric machines as power sources are defined or formed within the transaxle case C. Namely, the casing Cb is connected to the housing Ca, so that a gear chamber G that houses the gear mechanisms of the power transmission system is defined or formed within the transaxle case C, between a partition wall A provided in the housing Ca, and a partition wall B provided in the casing Cb. A case defined by the partition wall A provided in the housing Ca, and the partition wall B provided in the casing Cb is an example of a first case having the gear chamber. In the gear chamber G, the gear mechanisms, such as the planetary gear train 40 of the power transmission system T, and the differential device 50, are housed. Also, the rear cover Cc is connected to the casing Cb, so that a motor chamber M as a space that houses the rotating electric machines is defined or formed within the transaxle case C, between the partition wall B provided in the casing Cb and an inner wall of the rear cover Cc. A case defined by the partition wall B provided in the casing Cb and the inner wall of the rear cover Cc is an example of a second case having the motor chamber. The rotating electric machines 20, 30 are housed in the motor chamber M. Thus, the transaxle case C includes the gear chamber G, and the motor chamber M that is separated from the gear chamber G by the partition wall B. Also, lubricating oil is stored in a bottom portion of the gear chamber G within the transaxle case C.

In the hybrid vehicle of this embodiment, when the final reduction gear 52 of the differential device 50 receives power from the engine 10, etc., and rotates, the lubricating oil in the bottom portion of the gear chamber G is stirred up with rotation of the gear 52, and the lubricating oil is supplied to the gear mechanisms, such as the planetary gear train 40, housed in the gear chamber G. Namely, the hybrid vehicle of this embodiment uses the above-mentioned stirring-up lubrication as a method of lubricating the gear mechanisms of the power transmission system T housed in the gear chamber G. Therefore, the lubricating oil stirred up due to rotation of the final reduction gear 52 of the differential device 50 is supplied to the cylindrical gear sleeve 46 having the external gear portion 46b on its outer circumferential surface, in the planetary gear train 40 housed in the gear chamber G. The lubricating oil is also supplied to constituent members placed inside the gear sleeve 46, for example, to the planetary gears 44, etc. that are contained in the gear sleeve 46 and mesh with the internal gear portion 46a on the inner circumferential surface of the gear sleeve 46. More specifically, a part of the lubricating oil passes through the ball bearings 47a, 47b that support the gear sleeve 46, from the sides closer to the partition walls B, A to which these bearings are mounted, toward the inside of the gear sleeve 46, in the direction of the rotational axis, so as to be supplied to the above constituent members. To the constituent members, such as the planetary gears 44, placed inside the gear sleeve 46, the lubricating oil is also supplied by a method other than stirring-up lubrication. Namely, the lubricating oil is fed under pressure through oil passages provided in a hollow portion of the pump drive shaft 12 and radially inner portions of the planetary gear shafts 43, for example, using the mechanical oil pump 60 or the electrically powered oil pump (not shown) as hydraulic sources, so that the lubricating oil is supplied to the above constituent members. This type of lubrication structure is disclosed in JP 2016-168950 A, for example.

When the vehicle travels at a high speed, the rotational speed of the gear sleeve 46 (output member) of the planetary gear train 40 increases, and the rotational speed of the ball bearings 47a, 47b that support the gear sleeve 46 also increases. As a result, passage of the lubricating oil through the ball bearings 47a, 47b is impeded by rotation of the ball bearings 47a, 47b, as described above. In this case, as the vehicle speed is higher, namely, as the rotational speed of the gear sleeve 46 is higher, the lubricating oil is less likely to pass through the ball bearings 47a, 47b. As a result, the lubricating oil that fails to pass through the bearings is retained in gaps between end portions (on the side adjacent to the partition walls) of the ball bearings 47a, 47b that support the gear sleeve 46, and the partition walls (B, A), and the resistance to stirring during rotation of the gear sleeve 46 increases due to the retained lubricating oil, resulting in increase of a stirring loss.

Thus, in order to deal with the above problem, a communication hole is provided in the partition wall that separates the gear chamber from the motor chamber in the transaxle case, as a lubrication structure of the hybrid vehicle of this embodiment. In the following, this lubrication structure (communication hole) will be specifically described.

As shown in FIG. 2, the communication hole (oil drain hole) 80 is provided in the partition wall B that separates the gear chamber G from the motor chamber M in the transaxle case C, and is formed so as to communicate the gear chamber G with the motor chamber M. An opening 80g of the oil drain hole 80 on the gear chamber G side is formed in a portion of the partition wall B which faces the vicinity of an outer peripheral edge 47a1 of the ball bearing 47a. In this embodiment, the range of the vicinity of the outer peripheral edge 47a1 is a radially continuous portion from an inner peripheral edge 47a1' of an outer race of the ball bearing 47a to an outer peripheral edge 46c of the gear sleeve 46. Therefore, the opening 80g of the oil drain hole 80 on the gear chamber G side is formed in an opposed portion Bo1 of the partition wall B which is opposed to the above radially continuous portion. Namely, as the vehicle speed increases, and the rotational speed of the gear sleeve 46 increases, the lubricating oil is retained in a gap between an end portion of the ball bearing 47a (and the gear sleeve 46) closer to the partition wall B, and the partition wall B. The above-mentioned opposed portion Bo1 is a portion in which the lubricating oil retained in this case contacts with the rotating gear sleeve 46 and ball bearing 47a, and is stirred. By forming the opening 80g of the oil drain hole 80 in this portion, it is possible to curb increase of a stirring loss, which would occur with rotation of the gear sleeve 46 when the vehicle speed becomes high.

An opening 80m of the oil drain hole 80 on the motor chamber M side is located in the partition wall B, at a position lower than the opening 80g on the gear chamber G side. Namely, the openings 80g, 80m are formed, such that the oil drain hole 80 is inclined downward from the gear chamber G to the motor chamber M. In this case, if the lubricating oil retained in the gap between the vicinity of the end portion (closer to the partition wall B) of the ball bearing 47a and the partition wall B flows into the opening 80g on the gear chamber G side, the lubricating oil flows down toward the motor chamber M, through the oil drain hole 80, and is discharged from the opening 80m on the motor chamber M side. In the example of the oil drain hole 80 shown in FIG. 2, the opening 80g on the gear chamber G side is formed such that the upper end of the opening 80g is located at a position of the opposed portion Bo1 of the partition wall B which is opposed to the outer peripheral edge 47a1 on the radially outer side of the ball bearing 47a. On the other hand, the opening 80m on the motor chamber M side is formed at a position on the partition wall B, which is lower than the position of the opening 80g on the gear chamber G side. In this case, the lubricating oil is smoothly drained from the gear chamber G to the motor chamber M side, owing to the downward inclination of the oil drain hole 80.

Figure 3:
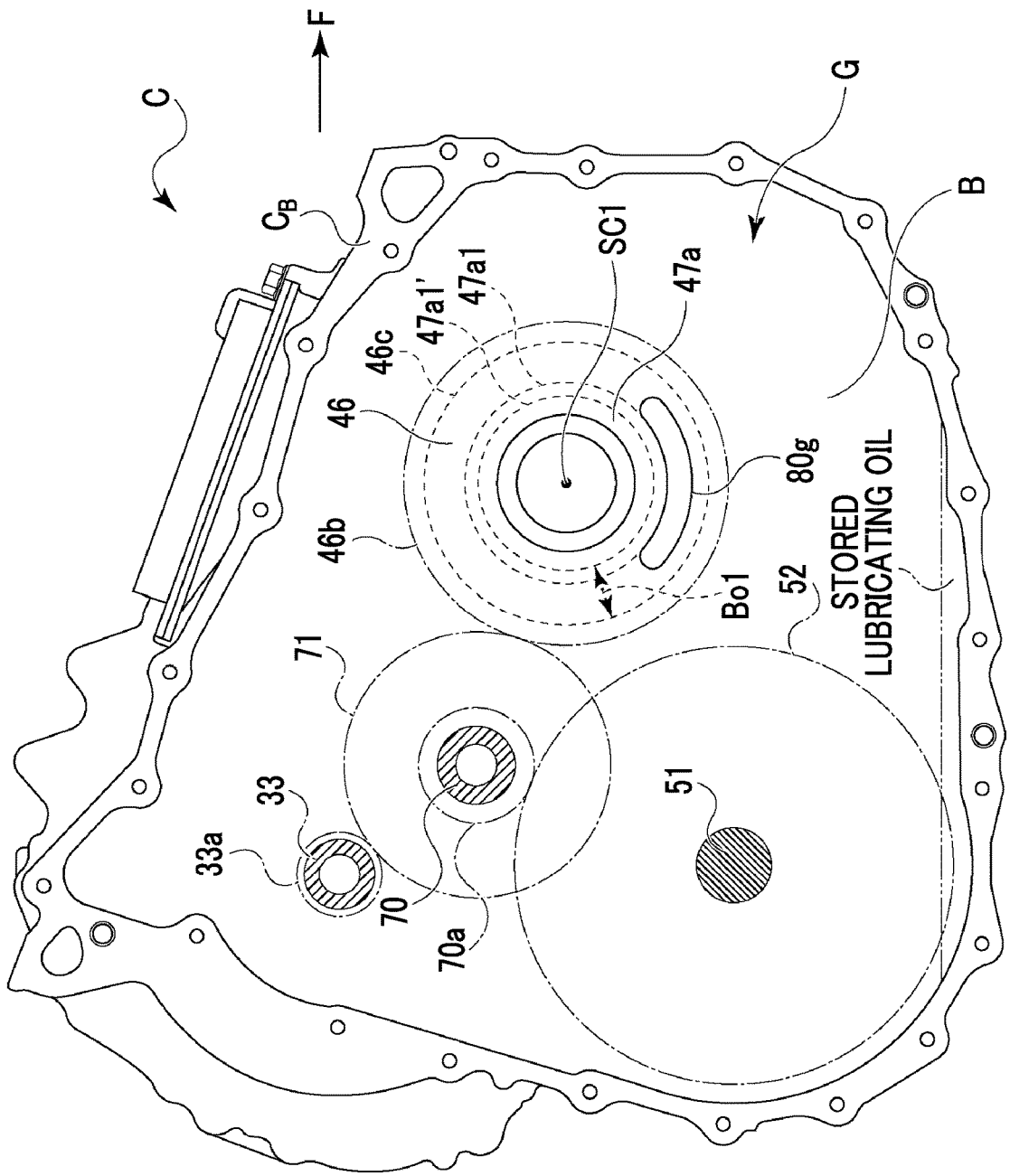
FIG. 3 is a side overview of an oil drain hole (communication hole) shown in FIG. 2, when it is seen from the gear chamber side.

FIG. 3 is a side overview of the oil drain hole 80 illustrated in FIG. 2 as seen from the gear chamber G side. In FIG. 3, the direction indicated by arrow "F" denotes the front side of the vehicle. As shown in FIG. 3, the opening 80g of the oil drain hole 80 on the gear chamber G side is provided in a portion of the opposed portion Bo1 of the partition wall B, which is lower than the axis SC1 of the ball bearing 47a. Thus, with the opening 80g of the oil drain hole 80 on the gear chamber G side thus provided in the portion of the opposed portion Bo1 lower than the axis SC1 of the ball bearing 47a, when the lubricating oil is retained in the above-mentioned gap as the vehicle speed increases and the rotational speed of the gear sleeve 46 increases, the retained lubricating oil flows into the opening 80g, to be discharged toward the motor chamber M side. With the lubricating oil thus drained, the amount of the lubricating oil retained in the above gap is reduced; therefore, the stirring loss that would occur with rotation of the gear sleeve 46 is less likely or unlikely to increase when the vehicle speed becomes high. When the vehicle speed is not so high, and the rotational speed of the gear sleeve 46 is not so high, the lubricating oil supplied by stirring passes through the ball bearing 47a toward the inside of the gear sleeve 46, rather than flowing into the opening 80g of the oil drain hole 80 provided in the portion lower than the axis SC1; therefore, a sufficient amount of lubricating oil can be supplied to the constituent members placed on the inner side of the gear sleeve 46.

The partition wall B may be provided with a protruding portion that protrudes from a lower edge portion (as viewed in the vertical direction) of the opening 80g of the oil drain hole 80 on the gear chamber G side, toward the gear sleeve 46. The protruding portion provides a guide structure for causing the lubricating oil retained in the above gap as the rotational speed of the gear sleeve 46 increases, to more positively flowing into the opening 80g on the gear chamber G side. With the protruding portion thus provided, the lubricating oil can be more effectively drained from the gear chamber G to the motor chamber M side.

With the lubricating oil thus discharged from the gear chamber G toward the motor chamber M side through the oil drain hole 80 provided in the partition wall B as described above, an oil pool OM is formed on a bottom of a portion of the motor chamber M in which the first rotating electric machine 20 is housed, as shown in FIG. 2. Therefore, the first rotating electric machine 20 can be cooled by the oil (lubricating oil) of the oil pool OM. The oil of the oil pool OM in the motor chamber M is ultimately returned (discharged) to the gear chamber G side, through an oil return hole (not shown) that is provided in the partition wall B and communicates with the motor chamber M and the gear chamber G. The opening 80m on the motor chamber M side of the oil drain hole 80 formed in the partition wall B is formed at a position where the lubricating oil that is discharged from the opening 80m and flows down into the motor chamber M does not contact with the rotor 22 of the first rotating electric machine 20 in the motor chamber M while it is flowing down. More specifically, the opening 80m on the motor chamber M side is formed in the partition wall B, at a position lower than the lowermost end (as viewed in the vertical direction) of the rotor 22 of the first rotating electric machine 20 in the motor chamber M, for example. With this arrangement, when the rotor 22 of the first rotating electric machine 20 also rotates, the lubricating oil discharged from the opening 80m is prevented from causing stirring resistance to rotation of the rotor 22.

Figure 4A:
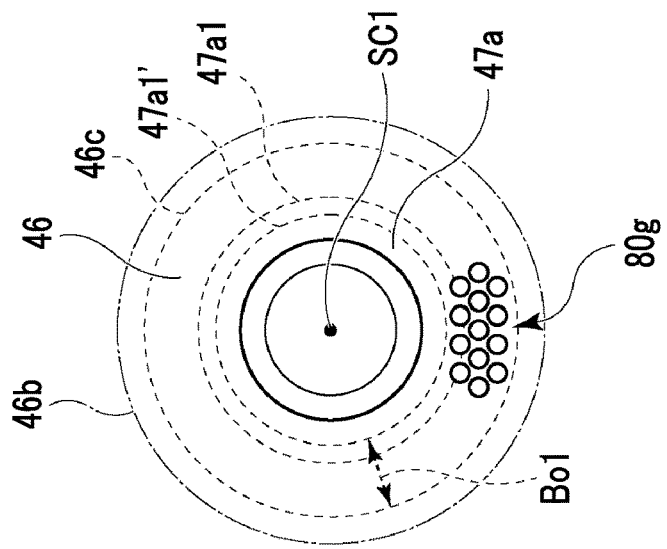
FIG. 4A is a view showing typical examples of oil drain holes (the shape and the number of holes are changed)
Figure 4B:
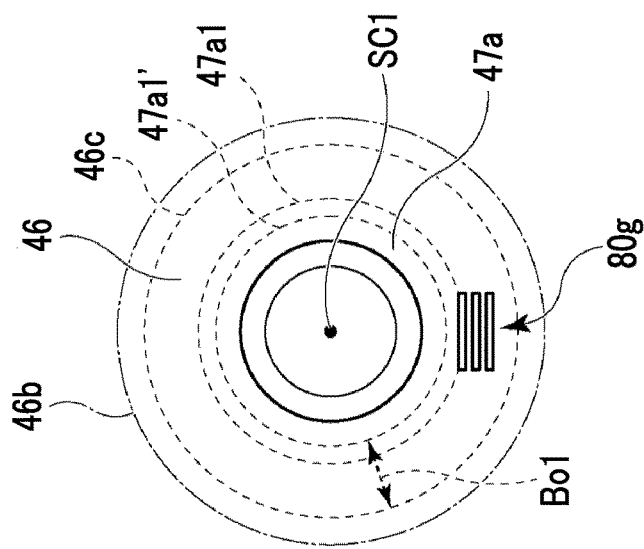
FIG. 4B is a view showing typical examples of oil drain holes (the shape and the number of holes are changed)
Figure 4C:
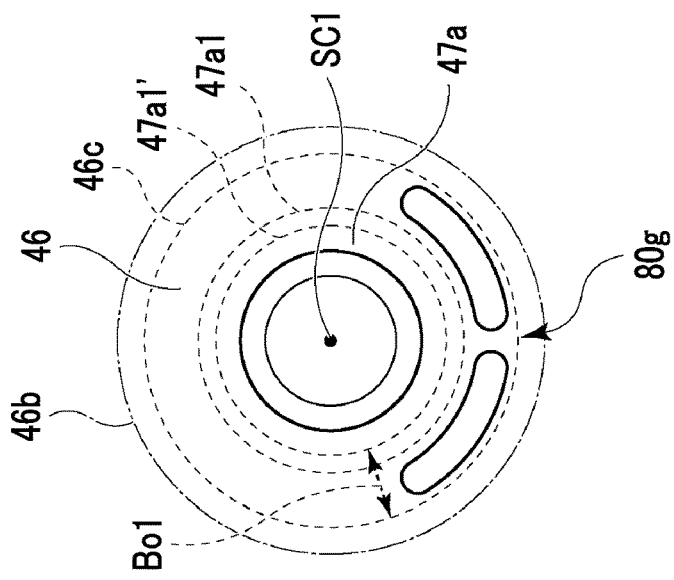
FIG. 4C is a view showing typical examples of oil drain holes (the shape and the number of holes are changed).

While only one arc-like hole is provided as the oil drain hole 80 in the example of FIG. 3, the oil drain hole 80 may consist of two or more holes, and the shape and the number of the holes may be those as follows. For example, as shown in FIG. 4A, two arc-like holes may be provided as oil drain holes 80, in a portion of the opposed portion Bo1 (on the gear chamber G side) of the partition wall B, which portion is lower than the axis SC1 of the ball bearing 47a, such that the two holes are located concentrically about the axis SC1 as the center while being arranged side by side in the circumferential direction. In another example shown in FIG. 4B, three straight slit-like holes may be provided as oil drain holes 80, in the above-indicated portion, such that these holes extending in the lateral direction are arranged vertically downward of the axis SC1. In a further example shown in FIG. 4C, a plurality of circular holes is provided as oil drain holes 80, in the above-indicated portion, such that these holes are located vertically downward of the axis SC1 while being arranged in two or more rows in a zigzag pattern. The above examples are illustrated as mere examples of the oil drain holes 80, and the shape and number of the oil drain holes 80 are not limited to those of the above examples.

In any case, the shape and number of hole(s) as the oil drain hole(s) 80 are determined in advance by experiment, or the like, in view of the following point regarding the amount of the lubricating oil discharged from the gear chamber G toward the motor chamber M side through the oil drain hole(s) 80. Namely, the amount of the lubricating oil discharged through the oil drain hole(s) 80 is determined so as to curb increase of the stirring loss which occurs when the rotational speed of the gear sleeve 46 becomes high, and also ensure supply of the lubricating oil to the constituent members placed on the inner side of the gear sleeve 46 when the rotational speed of the gear sleeve 46 is not so high. This point is also taken into consideration when the location of the opening 80g on the gear chamber G side of the oil drain hole 80, in the opposed portion Bo1 of the partition wall B, is determined.

In the meantime, a parking lock mechanism is installed on the hybrid vehicle of this embodiment. As shown in FIG. 1 and FIG. 2, a parking gear 90 that constitutes the parking lock mechanism is provided on an outer circumferential surface of the gear sleeve 46 as a constituent member of the planetary gear train 40 of the power transmission system T mounted between the engine 10 and the first rotating electric machine 20. More specifically, on the outer circumferential surface of the gear sleeve 46, the parking gear 90 is formed integrally with the gear sleeve 46, specifically, with its end portion closer to the partition wall B and opposite to the external gear portion 46b. In the hybrid vehicle of this embodiment, a lock member (not shown) is engaged with the parking gear 90, so that the drive wheels W and the power transmission system T are locked and inhibited from rotating, while the vehicle is stopped.

Thus, in the case where the parking gear 90 is provided on the end portion (closer to the partition wall B) of the outer circumferential surface of the gear sleeve 46, the lubricating oil retained in a gap between an end portion (closer to the partition wall B) of the parking gear 90 and the partition wall B is stirred up with tooth faces of the parking gear 90 that rotates as a unit with the gear sleeve 46, as the vehicle speed becomes high, and the rotational speed of the gear sleeve 46 becomes high. Namely, in this case, the stirring loss due to rotation of the gear sleeve 46 is increased by an amount corresponding to the lubricating oil that is retained in the above gap and stirred up with the tooth faces of the parking gear 90, as compared with the case where the parking gear 90 is not provided on the outer circumferential surface of the gear sleeve 46. However, in the hybrid vehicle of this embodiment, the lubricating oil retained in the above gap is discharged from the gear chamber G toward the motor chamber M, through the oil drain hole 80 that is provided in the partition wall B within the transaxle case C and communicates with the gear chamber G and the motor chamber M, so that the amount of the lubricating oil retained is reduced, and increase of the stirring loss, which would occur when the vehicle speed is high, can be curbed.

This disclosure is also useful in a hybrid vehicle in which the parking gear is not provided, namely, a hybrid vehicle on which the parking lock mechanism is not installed.

What is claimed is:

1. A lubrication structure of a hybrid vehicle, the lubrication structure comprising:
   a first case having a gear chamber in which a planetary gear train connected to an engine and a rotating electric machine, and a differential device to which power is transmitted from the planetary gear train, are housed, the differential device being disposed in a lower portion of the gear chamber; and
   a second case having a motor chamber in which the rotating electric machine is housed, the motor chamber being separated from the gear chamber by a partition wall,
   wherein the lubrication structure is configured to supply a lubricating oil to the planetary gear train by stirring up the lubricating oil stored in a bottom portion of the gear chamber through rotation of a final reduction gear of the differential device,
   the planetary gear train includes a cylindrical output member that has an externally toothed gear for transmitting power to the differential device, on an outer circumferential surface of the cylindrical output member, and an internally toothed gear on an inner circumferential surface of the cylindrical output member, and
   one end of the output member is rotatably supported by the partition wall via a bearing, and a communication hole that communicates the gear chamber with the motor chamber is provided in an opposed portion of the partition wall which is opposed to a vicinity of an outer peripheral edge of the bearing.

2. The lubrication structure according to claim 1, wherein the communication hole is provided in a portion of the opposed portion which is lower than an axis of the bearing.

3. The lubrication structure according to claim 2, wherein the communication hole has an opening on a gear chamber side, and the partition wall further includes a protruding portion that protrudes from a lower edge portion of the opening on the gear chamber side, toward the output member, the protruding portion being configured to cause the supplied lubricating oil to flow into the opening on the gear chamber side.

4. The lubrication structure according to claim 3, wherein the communication hole has an opening on a motor chamber side that is located at a position lower than a lowermost end of a rotor of the rotating electric machine.

5. The lubrication structure according to claim 2, wherein the communication hole has an opening on a motor chamber side that is located at a position lower than a lowermost end of a rotor of the rotating electric machine.

6. A hybrid vehicle comprising:
   a parking gear;
   an engine; and
   a lubrication structure including a first case and a second case,
      the first case having a gear chamber in which a planetary gear train connected to the engine and a rotating electric machine, and a differential device to which power is transmitted from the planetary gear train, are housed, the differential device being disposed in a lower portion of the gear chamber, and the second case having a motor chamber in which the rotating electric machine is housed, the motor chamber being separated from the gear chamber by a partition wall, wherein the lubrication structure is configured to supply a lubricating oil to the planetary gear train by stirring up the lubricating oil stored in a bottom portion of the gear chamber through rotation of a final reduction gear of the differential device, the planetary gear train includes a cylindrical output member that has an externally toothed gear for transmitting power to the differential device, on an outer circumferential surface of the cylindrical output member, and an internally toothed gear on an inner circumferential surface of the cylindrical output member, one end of the output member is rotatably supported by the partition wall via a bearing, and a communication hole that communicates the gear chamber with the motor chamber is provided in an opposed portion of the partition wall which is opposed to a vicinity of an outer peripheral edge of the bearing, and the parking gear is provided on an end portion of the output member which is located closer to the partition wall and opposite to the externally toothed gear.

7. The hybrid vehicle according to claim 6, wherein the communication hole is provided in a portion of the opposed portion which is lower than an axis of the bearing.

8. The hybrid vehicle according to claim 7, wherein the communication hole has an opening on a gear chamber side, and the partition wall further includes a protruding portion that protrudes from a lower edge portion of the opening on the gear chamber side, toward the output member, the protruding portion being configured to cause the supplied lubricating oil to flow into the opening on the gear chamber side.

9. The hybrid vehicle according to claim 8, wherein the communication hole has an opening on a motor chamber side that is located at a position lower than a lowermost end of a rotor of the rotating electric machine.

10. The hybrid vehicle according to claim 7, wherein the communication hole has an opening on a motor chamber side that is located at a position lower than a lowermost end of a rotor of the rotating electric machine.

* * * * *